J. R. FRANKLIN.
HINGE BELT FASTENER.
APPLICATION FILED AUG. 14, 1917.
1,286,574.
Patented Dec. 3, 1918.
2 SHEETS—SHEET 1.
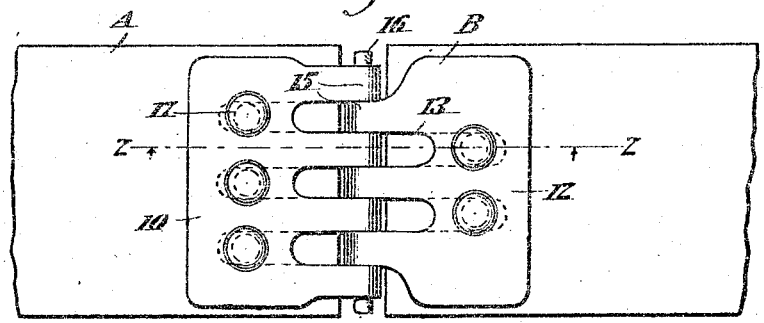
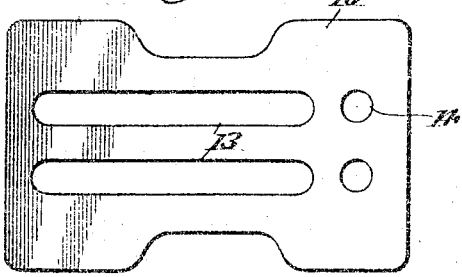
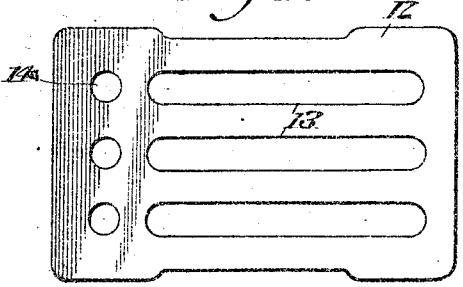
WITNESSES
INVENTOR
John R. Franklin
BY Victor J. Evans
ATTORNEY J. R. FRANKLIN.
HINGE BELT FASTENER.
APPLICATION FILED AUG. 14, 1917.
1,286,574.
Patented Dec. 3, 1918.
2 SHEETS—SHEET 2.
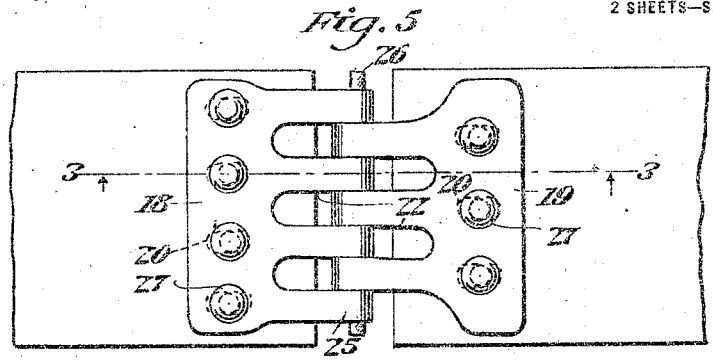
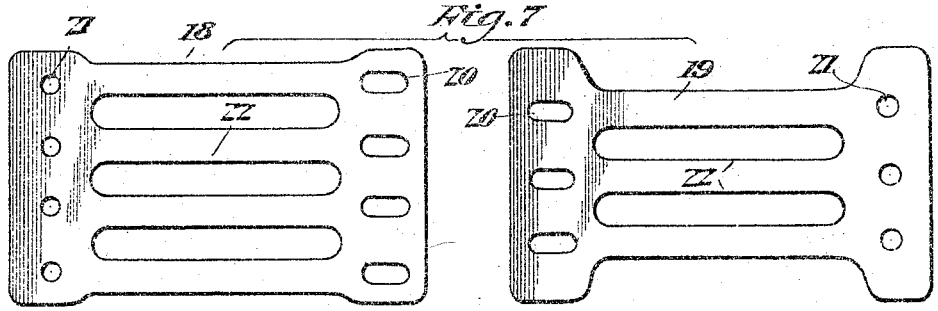
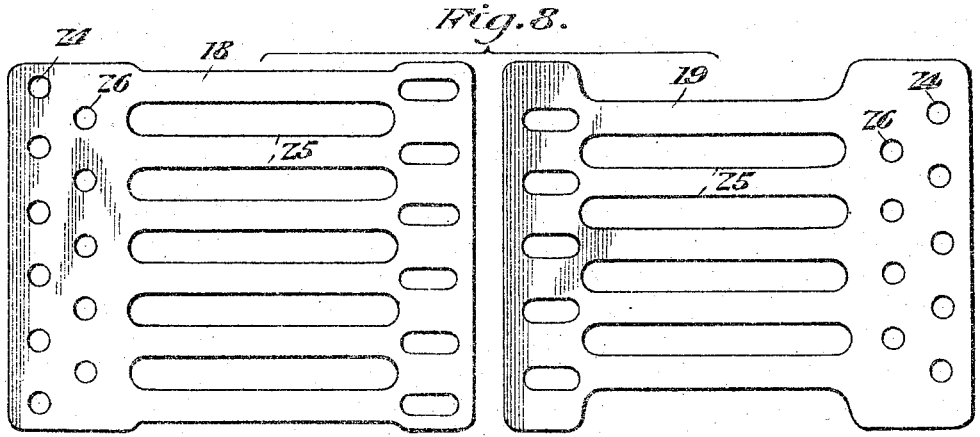
Inventor
John R. Franklin
Witness
By Victor J. Evans
Attorney ated Dec. 3, 1918.
UNITED STATES PATENT OFFICE.

JOHN R. FRANKLIN, OF CINCINNATI, OHIO, ASSIGNOR TO BLACK DIAMOND MFG. CO., OF CINCINNATI, OHIO.

HINGE BELT-FASTENER.

1,286,574.  Specification of Letters Patent.  Patented Dec. 3, 1918.

Application filed August 14, 1917. Serial No. 186,177.

*To all whom it may concern:*

Be it known that I, JOHN R. FRANKLIN, a citizen of the United States, residing at Cincinnati, in the county of Hamilton and State of Ohio, have invented new and useful Improvements in Hinge Belt-Fasteners, of which the following is a specification.

This invention relates to a device for connecting the meeting ends of belts which is an improvement upon the belt fastener I am now manufacturing under the protection of my U. S. Patent, No. 831,050 issued Sept. 18, 1906.

The primary object of the invention is to provide a hinge belt fastener which may be more easily and quickly applied than my patented device to the meeting ends of the belt and which is so constructed as to positively prevent the pintle pin from being sheared off by the pintle pin loops while the belt is in use.

Another object of the invention is to provide a fastener of this character wherein the two members for connection with the meeting ends of the belt are hingedly connected by a resilient pintle pin which enables the fastener to be employed to connect the meeting ends of belts used in connection with either crowned or grooved pulleys.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications within the scope of the claims may be resorted to when desired.

In the drawings:—

Figure 1 is a top plan view of the meeting ends of a belt, showing the same connected by the improved fastener.

Fig. 2 is a longitudinal section on the line 2—2 of Fig. 1.

Fig. 3 is a plan view of the blank from which one of the members comprising the fastener is formed.

Fig. 4 is a similar view of the other member, forming a part of the fastener.

Fig. 5 is a top plan view of the meeting ends of a belt, showing the same connected by a slightly modified form of the invention.

Fig. 6 is a longitudinal section on the line 6—6 of Fig. 5.

Fig. 7 is a plan view of the blanks from which the members in the modified form of the invention for connection with the meeting ends of the belt are formed.

Fig. 8 is a plan view of the blanks from which a further modified form of the invention may be formed.

Like characters of reference denote corresponding parts throughout the several views in the drawings.

Referring now to Figs. 1 to 4, inclusive, wherein the preferred form of the invention is shown connecting the meeting ends of a belt A, with the improved fastener B comprising a pair of plates 10 and 12, with each plate having formed therein a transversely extending row of longitudinally extending slots 13 and a transversely extending row of spaced openings 14 in line with the slots 13. The plates 10 and 12 are folded upon themselves to provide pintle loops 15, with the loops upon one of the plates interleaved with the loops upon the plate for connection therewith and through these loops is passed a resilient pintle pin 16, preferably formed from raw hide.

The ends of the belt are passed between the folded portions of the plates 10 and 12, with the slots in one of the folded portions of the plates extending beyond the openings 14, so that when the shanks of split rivets 17 are passed through said openings and slots and through the belt, the portions of the plates underlying the portions of the plates in which the openings 14 are formed may move longitudinally with relation to the last-mentioned portion of the plate, thus obviating the likelihood of the pintle pin being cut when an undue strain is imposed upon the belt when the belt is in use.

Referring now to the remaining figures in the drawings, wherein a slight modification of the invention is shown, and wherein the fastener is constructed from a pair of plates 18 and 19, with each plate having formed therein adjacent one of its ends, a transversely extending row of longitudinally extending slots 20 and adjacent its other end with a transversely extending row of spaced openings 21 in line with the slots 20. Interposed between the slots 20 and openings 21 is a second transversely extending row of longitudinally extending slots 22.

The plates 18 and 19 are folded upon themselves to provide pintle loops 25, with the pintle loops upon one of the plates interleaved with the pintle loops upon the plate which is connected therewith by a resilient pintle pin 26 passed through said loops. The folded portions of the plates 18 and 19 receive therebetween the meeting ends of the belt, with the slots 20 underlying the openings 21, so that the shanks of split rivets 27 may be passed through the openings 21 and the slots 20, and through suitable openings in the belt.

In Fig. 8 in the drawings I have disclosed a belt fastener which is intended for use upon the extra wide belts and wherein a pair of plates 18 and 19 have formed therein adjacent one end of the plates a transversely extending row of spaced slots 23. Adjacent the other end of each plate is a transversely extending row of spaced openings 24 and between the slots 23 and 24 is a transversely extending row of elongated and longitudinally extending slots 25. Between the slots 25 and the opening 24 is a second transversely extending row of spaced openings 26 which are in line with the slots 25, while the openings 24 are in line with the slots 23.

When the modified form of fastener shown in Fig. 8 in the drawings is employed to connect the meeting ends of a belt, the plates are folded upon themselves with the openings 24 and 26 overlying the slots 23 and 25, and through these openings and slots, and the belt are passed the split rivets 27, it of course being understood that the plates are connected by a pintle passed through the loops formed therefrom.

From the above described manner of connecting the plates 18 and 19 with the meeting ends of the belt, it will be apparent that the folded portions of the plates which underlie the portions of the plates in which the openings 21 and 23 are formed are free to move longitudinally of the belt when an undue strain is imposed thereon, while the belt is in use, thus obviating any likelihood of the rivets being cut and the belt becoming disconnected.

From the foregoing description, taken in connection with the accompanying drawings, it is at once apparent that a belt fastener of the hinged type has been provided which though comparatively inexpensive of manufacture, is highly efficient for the purpose set forth.

Having thus described the invention, what is claimed as new, is:—

1. A hinged belt fastener, comprising a pair of plates of flexible material, each doubled upon itself so that its ends are in mutual contact and in overlapping relation, each plate having longitudinal slots intermediate its ends so that loops are formed by bights between the slots, and loops of each plate being arranged in the said slots of the other plates; a pintle extending through the loops of said plates and connecting said plates together, and each plate also having rivet receiving openings near one end, said openings being in registry with the slots of said plate and said slots extending beyond said openings to enable the plates to yield under stress and permit the rivets to move in said slots and thereby prevent the shearing of the pintle.

2. A hinged belt fastener, comprising a pair of plates of flexible material, each doubled upon itself so that its ends are in mutual contact and in overlapping relation, each plate having loops at one end formed by its doubled portion, the loops of said plates being interleaved, and a pintle passing through said loops, said plates also having rivet receiving openings near one end and slots extending to near the opposite end and in registry with and extending beyond said openings to enable the plates to yield under stress and permit the rivets to move in said plates and thereby prevent the shearing of the pintle.

In testimony whereof I affix my signature.

JOHN R. FRANKLIN.